US012292087B2

United States Patent
Del Borrello et al.

(10) Patent No.: US 12,292,087 B2
(45) Date of Patent: May 6, 2025

(54) PAIR OF CONNECTABLE PORTIONS FOR CONNECTING A TRANSMISSION SHAFT AND A ROLLER

(71) Applicant: PHILIP MORRIS PRODUCTS S.A., Neuchatel (CH)

(72) Inventors: Michele Del Borrello, Vasto (CH); Ivan Prestia, Calderara di Reno (IT)

(73) Assignee: Philip Morris Products S.A., Neuchatel (CH)

( * ) Notice: Subject to any disclaimer, the term of this patent is extended or adjusted under 35 U.S.C. 154(b) by 1284 days.

(21) Appl. No.: 16/966,077

(22) PCT Filed: Jan. 23, 2019

(86) PCT No.: PCT/EP2019/051661
§ 371 (c)(1),
(2) Date: Jul. 30, 2020

(87) PCT Pub. No.: WO2019/154625
PCT Pub. Date: Aug. 15, 2019

(65) Prior Publication Data
US 2020/0362918 A1  Nov. 19, 2020

(30) Foreign Application Priority Data
Feb. 8, 2018 (EP) .................................. 18155884

(51) Int. Cl.
*F16D 1/092* (2006.01)
*A24B 3/14* (2006.01)
(52) U.S. Cl.
CPC ............... *F16D 1/092* (2013.01); *A24B 3/14* (2013.01)

(58) Field of Classification Search
CPC ... A24B 3/14; F16D 1/09; F16D 1/092; F16D 2001/0903; F16D 2001/102
(Continued)

(56) References Cited

U.S. PATENT DOCUMENTS 826,944 A * 7/1906 Krieger ................... F16D 1/092
403/333
1,468,270 A * 9/1923 Kent ......................... F16D 1/09
279/2.12
(Continued)

FOREIGN PATENT DOCUMENTS

| CN | 87100133 | 8/1987 |
|---|---|---|
| DE | 625353 | 2/1936 |

(Continued)

OTHER PUBLICATIONS

Office Action issued in Russia for Application No. 2020127496 dated May 23, 2022 (16 pages). English translation included.
(Continued)

Primary Examiner — Josh Skroupa
(74) Attorney, Agent, or Firm — Mueting Raasch Group

(57) ABSTRACT

A transmission shaft and a roller comprising a pair of connectable portions (M, F) for connecting a transmission shaft (5, 8) and a roller (4, 7) to be driven by torque exerted through the transmission shaft (5, 8). The pair of connectable portions (M, F) comprise a male portion (M) provided on one of the transmission shaft (5, 8) and roller (4, 7) and a complementary female portion (F) provided on the other of the roller (4, 7) and transmission shaft (5, 8). The male portion (M) has a longitudinal axis of rotation (X) and tapers inwardly from a proximal end to a distal end. The male portion (M) has a non-circular cross section.

20 Claims, 3 Drawing Sheets

(58) Field of Classification Search
USPC .......................................................... 464/182
See application file for complete search history.

(56) References Cited

U.S. PATENT DOCUMENTS

| | | | |
|---|---|---|---|
| 2,307,507 A | 1/1943 | Bennett | |
| 2,634,991 A | 4/1953 | Stevens | |
| 3,424,019 A * | 1/1969 | Wolfram | F16D 1/09 403/258 |
| 3,776,651 A * | 12/1973 | Peter | F16D 1/09 403/370 |
| 4,787,402 A | 11/1988 | Leonard | |
| 4,935,683 A * | 6/1990 | Kobler | F16D 3/62 464/182 |
| 8,347,684 B2 | 1/2013 | Coderre | |
| 8,579,497 B2 * | 11/2013 | Harre | F16D 1/10 366/331 |
| 9,051,141 B2 * | 6/2015 | Kato | B65H 3/5261 |
| 9,512,884 B2 * | 12/2016 | Cherry | F16D 1/101 |
| 9,874,248 B2 * | 1/2018 | Haas | B29C 33/30 |
| 11,272,732 B2 | 3/2022 | Gindrat | |
| 2003/0183059 A1 * | 10/2003 | Eigenmann | B21D 43/09 83/684 |
| 2007/0140789 A1 | 6/2007 | Meggiolan | |
| 2016/0169292 A1 | 6/2016 | Cherry | |

FOREIGN PATENT DOCUMENTS

| | | | |
|---|---|---|---|
| DE | 2501513 A1 * | 7/1976 | ............... F16D 1/09 |
| DE | 19543334 | 5/1997 | |
| EP | 0007896 A1 * | 2/1980 | ............. F16D 1/092 |
| EP | 0032971 A2 * | 8/1981 | ............. F16D 1/092 |
| EP | 1 836 992 | 9/2007 | |
| EP | 2774760 A1 * | 9/2014 | ............. F16D 1/097 |
| FR | 2618115 A1 * | 1/1989 | ............... F16D 1/09 |
| GB | 414481 | 8/1934 | |
| GB | 1128021 A * | 9/1968 | ............... F16D 1/09 |
| JP | S59-44880 | 10/1985 | |
| JP | 61149615 A * | 7/1986 | ............... F16D 1/09 |
| JP | H06-230678 | 8/1994 | |
| JP | 2000-98808 | 4/2000 | |
| JP | 2004-1078 | 1/2004 | |
| JP | 2007-264379 | 10/2007 | |
| JP | 2009-179442 | 8/2009 | |
| JP | 2014-515274 | 6/2014 | |
| RU | 103590 | 4/2011 | |
| RU | 2471629 | 1/2013 | |
| WO | WO 2014/184168 | 11/2014 | |
| WO | WO 2015/028644 | 3/2015 | |
| WO | WO 2017/202538 | 11/2017 | |

OTHER PUBLICATIONS

PCT Search Report and Written Opinion for PCT/EP2019/051661 dated May 3, 2019 (10 pages).
Extended European Search Report for Application No. 18155884.2 dated Sep. 4, 2018 (8 pages).
Office Action issued in Japan for Application No. 2020-542658 dated Feb. 20, 2023 (19 pages). English translation included.
Office Action issued in China for Application No. 201980012235.3 dated Jul. 20, 2022 (17pages). English translation included.

* cited by examiner

PAIR OF CONNECTABLE PORTIONS FOR CONNECTING A TRANSMISSION SHAFT AND A ROLLER

This application is a U.S. National Stage Application of International Application No. PCT/EP2019/051661 filed Jan. 23, 2019, which was published in English on Aug. 15, 2019 as International Publication No. WO 2019/154625 A1. International Application No. PCT/EP2019/051661 claims priority to European Application No. 18155884.2 Feb. 8, 2018.

This invention relates generally to a pair of connectable portions for connecting a transmission shaft and a roller. More particularly, although not exclusively, this invention relates to a pair of connectable portions for connecting a transmission shaft and a roller to be driven by torque exerted through the transmission shaft.

Rollers are used for processing in a wide variety of industries. For example, rollers are used in a crimping process in the tobacco industry. In such a process, a cast leaf tobacco sheet or a sheet of polylactic acid (PLA) may be passed between two crimper rollers, both of which may be driven to rotate. The crimper rollers may have cooperating patterns formed on respective outer surfaces. A first of the rollers may have plural ridges on its outer surface, whilst the second roller may have plural grooves on its outer surface. In use, the first and second rollers are typically aligned such that the ridges and grooves cooperate to crimp the cast leaf tobacco sheet or the sheet of PLA as it is passes between them. The size of the features of the plural grooves and ridges are generally on a micrometre (μm) scale. Such fine details may be particularly susceptible to wear, through use, over time.

Rollers used for processing are typically driven by torque to rotate about their longitudinal axis. In the case of the crimping process in the tobacco industry the first and the second roller are typically driven by torque to rotate. The torque is commonly transmitted from a transmission shaft which may be connected to a roller to be driven. As will be appreciated by one skilled in the art, inefficient transmission of torque from the transmission shaft to the roller results in less efficient processing of an article processed by the roller. Moreover, a relatively greater amount of energy must be used in order to rotate the roller than would otherwise be necessary, carrying with it both an environmental and a financial cost.

It may be necessary or advantageous to periodically replace one or both of the rollers, for example to alter the patterning on their outer surface or to replace a worn or fouled roller. To this end, it is advantageous to ensure that the rollers are removably connected to the transmission shafts. As will be appreciated by one skilled in the art, the rollers cannot be used for processing whilst one or both are being removed or replaced. Such downtime in use of the rollers therefore carries a financial and time cost in respect of the manufacture of articles using such processing. Rollers for crimping cast leaf tobacco may be particularly susceptible to wear, damage and failure due to fouling and, accordingly, require frequent repair or replacement. Cast leaf tobacco may have a tacky surface at processing temperatures, consequently, the grooved and ridged surfaces of crimping rollers for cast leaf tobacco may be particularly prone to fouling. Furthermore, crimping must indent cast leaf sheet to a specific depth which means crimping equipment requires frequent adjustment to take into account batch variations of cast leaf sheet. Therefore, rollers for crimping in the tobacco industry may have a relatively greater financial and time cost due to downtime for repair, replacement and adjustment than rollers for processing in other industries.

When replacing a roller it may be necessary to ensure correct radial alignment of a newly connected or mounted roller with respect to a further roller, for example where there are cooperating patterns on the working surfaces of the two rollers. As will be appreciated, such radial alignment may prove to be time consuming and difficult to achieve in practice, particularly where the cooperating patterns are of a fine scale.

One known type of connection uses a Morse taper. The Morse taper comprises a male portion which is receivable within a complementary female portion. The male portion has a longitudinal axis of rotation and a circular cross-section. The male portion tapers inwardly from a proximal end to a distal end, typically at an angle of 1.49 degrees (equivalent to an included angle of approximately 3 degrees, i.e. an angle symmetrical about the longitudinal axis of rotation). The male portion may be provided on a first body with the female portion provided on a second, separate body. In use, the male portion is inserted into the complementary female portion. Frictional interference between the outer surface of the male portion and the inner surface of the female portion allows torque to be transmitted from the first body to the second body (or vice versa). The efficiency of transmission of torque is directly related to the application of a compressive force between the male and female portions.

One method of applying a compressive force between the male and female portions is through use of a central screw engaged through threaded bores in the male and female portions. Tightening of the central screw increases the compressive force between the male and female portions, thereby enhancing the efficiency of transfer of torque therebetween. However, such tightly connected central screws may be time consuming to engage and to remove. Moreover, the magnitude of the compressive force thereby applied may be difficult to judge.

It would be desirable to provide a connection between a transmission shaft and a roller which allows or enables more rapid removal of a roller from a transmission shaft. It would be desirable to provide a connection between a transmission shaft and a roller which allows or enables more rapid mounting of a roller to a transmission shaft. It would be desirable to provide a connection between a transmission shaft and a roller which provides efficient transmission of torque, in use, from the transmission shaft to the roller. It would be desirable to provide a connection between a transmission shaft and a roller which facilitates more rapid alignment of the roller relative to a further roller. It would also be desirable to provide a connection between a transmission shaft and a roller which at least partially mitigates against misalignment of the roller relative to a further roller.

According to an aspect of the invention there is provided a pair of connectable portions for connecting a transmission shaft and a roller to be driven by torque exerted through the transmission shaft. The pair of connectable portions comprises a male portion provided on one of the transmission shaft and roller. The pair of connectable portions also comprises a complementary female portion provided on the other of the roller and transmission shaft. The male portion has a longitudinal axis of rotation and tapers inwardly from a proximal end to a distal end. The male portion has a non-circular cross section.

Advantageously, the pair of connectable portions provides a mechanism which can be rapidly and readily connected and disconnected, for example for removal and replacement of the roller. Additionally, the pair of connectable portions provides efficient transmission of torque from the transmission shaft to the roller, when the pair of connectable portions are connected together. Advantageously, the non-circular cross section of the male portion provides indexed positioning of the roller and transmission shaft relative to one another. Provision of indexed positioning of the roller relative to the transmission shaft advantageously enables the roller to be accurately, rapidly and readily aligned to a further structure or surface, for example aligned to a further roller.

Further advantageously, the inward tapering of the male portion allows for a relatively rapid centering of the roller on the transmission shaft, when being mounted thereon. The taper of the corresponding female portion co-operates with the taper of the male portion such that, even if initially partially misaligned, the male portion and female portion are drawn into correct central alignment with one another, thereby correctly aligning the roller and the transmission shaft.

As used herein, a 'transmission shaft' relates to a shaft which transmits torque, in use, from a source of torque (or further interconnection) and a further body (such as a roller). The transmission shaft may be connected or connectable to the source of torque (or further interconnection) by any suitable means, for example gears or the like.

As used herein, a 'roller' relates to a device having a generally cylindrical outer surface intended to contact and hence process a sheet or plate material, in use. By a sheet or plate material it is meant that the length and width of the article are significantly greater than is the article's thickness. As used herein, the term 'driven' is intended to mean rotated by the application of an external force, e.g. torque.

As used herein, the term 'complementary' is intended to mean that the geometry and dimensions of the female portion are configured to substantially correspond to the geometry and dimensions of the male portion. For example, the cross-sectional geometry and dimensions of the female portion may be configured to substantially correspond to the cross-sectional geometry and dimensions of the male portion. Corresponding geometry and dimensions may mean that the geometry and dimensions of the female portion are selected to be at least substantially the same as those of the male portion, in a negative image. Corresponding geometry and dimensions may mean that the geometry and dimensions of the female portion are selected such that, when the male portion is fully inserted within the female portion, relative rotation of the male and female portions is prevented or at least partially restricted. For example, one or more cross-sectional diameter of the male portion may exceed one or more cross-sectional diameter of the female portion, at adjacent cross-sectional parts of the female and male portions when the male portion is fully inserted into the female portion. At least part of the geometry of the female portion may comprise a negative image of at least part of the geometry of the male portion.

As used herein, the phrase 'longitudinal axis of rotation' is intended to mean an axis extending through the male portion about which the male portion is rotated or rotatable, in use.

As used herein, the phrase 'tapers' is intended to mean that the radial dimension from the axis to the surface of the male portion progressively alters along the length of the male portion. As used herein, the 'proximal end' of the male portion is intended to mean the end of the male portion at or adjacent the interface between the male portion and the roller or transmission shaft on which it is provided. As used herein, the 'distal end' of the male portion is intended to mean the end of the male portion which is distal from the interface between the male portion and the roller or transmission shaft on which it is provided.

In some embodiments, the male portion may be provided on the transmission shaft and the female portion may be provided in the roller.

In some embodiments, the cross-sectional shape of the male portion may remain constant along at least 50% of the distance from the proximal end to the distal end of the male portion.

The male portion may have an order of rotational symmetry from 1 to 20, or optionally from 2 to 10, or optionally from 2 to 6, or optionally an order of rotational symmetry of 4.

In some embodiments, the male portion may have an elliptical or polygonal cross section. Advantageously, a polygonal cross section of the male portion provides a more energy efficient transfer of torque from the transmission shaft to the roller than could be achieved using a circular cross section of male portion, for example. Without wishing to be bound by any particular theory, it is believed that a polygonal cross section of the male portion provides a male portion having less volume than a male portion with a circular cross section and having the same maximum base dimension, length and angle of taper. A male portion having a relatively reduced volume has a correspondingly relatively reduced inertia. Accordingly, using a male portion having such relatively reduced inertia allows torque to be transferred to the roller from the transmission shaft with relatively enhanced efficiency.

Where the male portion has a polygonal cross section the vertices may be curved. Advantageously, we have found that providing vertices which are curved increases the useful lifetime of the pair of connectable portions. It is believed that such curved vertices decrease the torsional and sheer stresses exerted on the corners of the male portion, in use.

In some embodiments, the male portion may have a rectangular cross section. The male portion may have a square cross section.

In some embodiments, the male portion may taper inwardly from its proximal end to its distal end by an angle (e.g. relative to its longitudinal axis) of greater than 2.5 degrees, for example greater than 3, 4, 5, 6, 7, 8, 9, 10, 11, 12, 13, 14 or 15 degrees. In some embodiments, the male portion may taper inwardly from its proximal end to its distal end by an angle (e.g. relative to its longitudinal axis) of between 2.5 and 70 degrees, for example between 2.5, 3, 4, 5, 6, 7, 8, 9 or 10 degrees and 65, 60, 55, 50, 45, 40, 35, 30, 25, 20 or 15 degrees. In embodiments, the male portion may taper inwardly from its proximal end to its distal end by an included angle (e.g. symmetrical about the longitudinal axis of rotation) of greater than 5 degrees, for example greater than 6, 7, 8, 9, 10, 11, 12, 13, 14 or 15 degrees. In embodiments, the male portion may taper inwardly from its proximal end to its distal end by an included angle (e.g. symmetrical about the longitudinal axis of rotation) of between 5, 6, 7, 8, 9, 10, 11, 12, 13, 14, 15, 20, 25 or 30 degrees and 140, 135, 130, 125, 120, 115, 110, 105, 100, 95, 90, 85, 80, 75, 70, 65, 60, 55, 50, 45, 40 or 35 degrees.

In some embodiments, the roller may have a diameter from 150 mm to 300 mm. In some embodiments, the roller may comprise a surface for crimping a sheet material.

According to an aspect of the invention, there is provided a transmission shaft and a roller comprising a pair of connectable portions as described herein.

According to an aspect of the invention, there is provided a roller set comprising a transmission shaft and a roller comprising a pair of connectable portions as described herein.

In some embodiments, the transmission shaft may engage a first end of the roller. The roller set may further comprise a second shaft for engaging a second end of the roller. The roller and the second shaft may comprise a second pair of connectable portions. The second pair of connectable portions may have a second male portion, e.g. located on one of the roller and the second shaft. The second pair of connectable portions may comprise a complementary second female portion, e.g. located on the other of the second shaft and the roller. The second male portion may have a non-circular cross section. The second male portion may have a circular cross section. The second male portion may have a cross section different to the cross section of the first male portion.

Advantageously, the first and second male portions may have different cross sections. The roller may be mounted or mountable to the transmission shaft only at its first end and to the second shaft only at its second end. Advantageously, such an arrangement may therefore facilitate a correct mounting orientation. Further advantageously, the speed or rate of mounting of the roller may be relatively increased because it may not be necessary to determine (for example from a pattern on the working surface of the roller, where such a pattern is provided) which end of the roller should be connected to the transmission shaft and which end should be connected to the second shaft.

According to an aspect of the invention, there is provided a pair of roller sets for passing a sheet material therebetween, the first roller set as described herein. In some embodiments, the second roller set may comprise a pair of connectable portions as described herein. The pair of connectable portions of the second roller set may comprise a male portion with a different cross sectional shape to that of the male portion of the pair of connectable portions of the first roller set. In some embodiments, the pair of roller sets may be arranged to process a cast leaf tobacco sheet. The pair of roller sets may be arranged to process a cast leaf tobacco sheet between the roller of the first roller set and the roller of the second roller set.

Advantageously, such a construction will facilitate correct mounting orientation of one or both of the roller sets.

According to an aspect of the invention, there is provided a method of forming a connection between a transmission shaft and a roller to be driven by torque exerted through the transmission shaft, the method comprising:
axially aligning a male portion provided on one of the transmission shaft and roller with a complementary female portion provided on the other of the roller and transmission shaft;
moving the transmission shaft and roller relatively toward one another axially, such that the male portion engages within the complementary female portion;
wherein the male portion has a longitudinal axis of rotation, tapers inwardly from a proximal end to a distal end and has a non-circular cross section.

In some embodiments, the method of forming a connection between a transmission shaft and a roller to be driven by torque exerted through the transmission shaft may comprise securing the roller to the transmission device using a fastener.

According to an aspect of the invention, there is provided a method of driving the rotation of a roller, the method comprising transmitting torque from a transmission shaft to the roller by transmitting the torque between a male portion provided on one of the transmission shaft and roller and a corresponding female portion provided on the other of the roller and transmission shaft, wherein the male portion has a longitudinal axis of rotation, tapers inwardly from a proximal end to a distal end and has a non-circular cross section.

Aspects and embodiments may have a particularly beneficial use for the crimping of cast leaf tobacco.

All scientific and technical terms used herein have meanings commonly used in the art unless otherwise specified. The definitions provided herein are to facilitate understanding of certain terms used frequently herein.

Throughout the description and claims of this specification, the words "comprise" and "comprising" and variations of them mean "including but not limited to", and they are not intended to (and do not) exclude other moieties, additives, components, integers or steps. Throughout the description and claims of this specification, the singular encompasses the plural, and vice versa, unless the context otherwise requires. In particular, where the indefinite article is used, the specification is to be understood as contemplating plurality as well as singularity, unless the context requires otherwise.

For the avoidance of doubt, any of the features described herein apply equally to any aspect of the invention. Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

The invention will now be further described, by way of example only, with reference to the accompanying drawings, in which.

Figure 1:
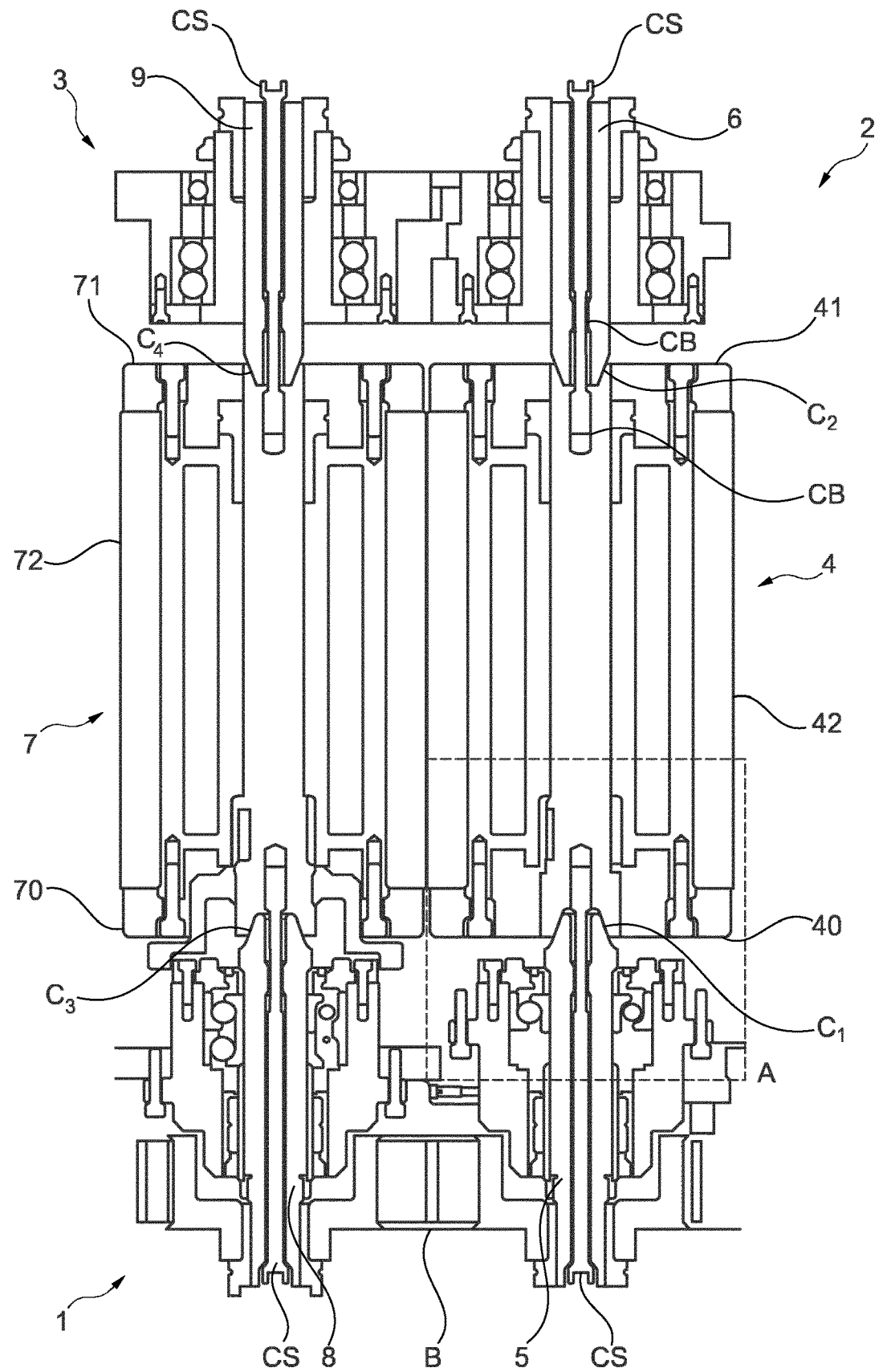
FIG. 1 is a schematic cross-sectional view of a roller apparatus comprising a pair of connectable portions for connecting a roller and a transmission shaft according to an embodiment of the invention.
Figure 2:
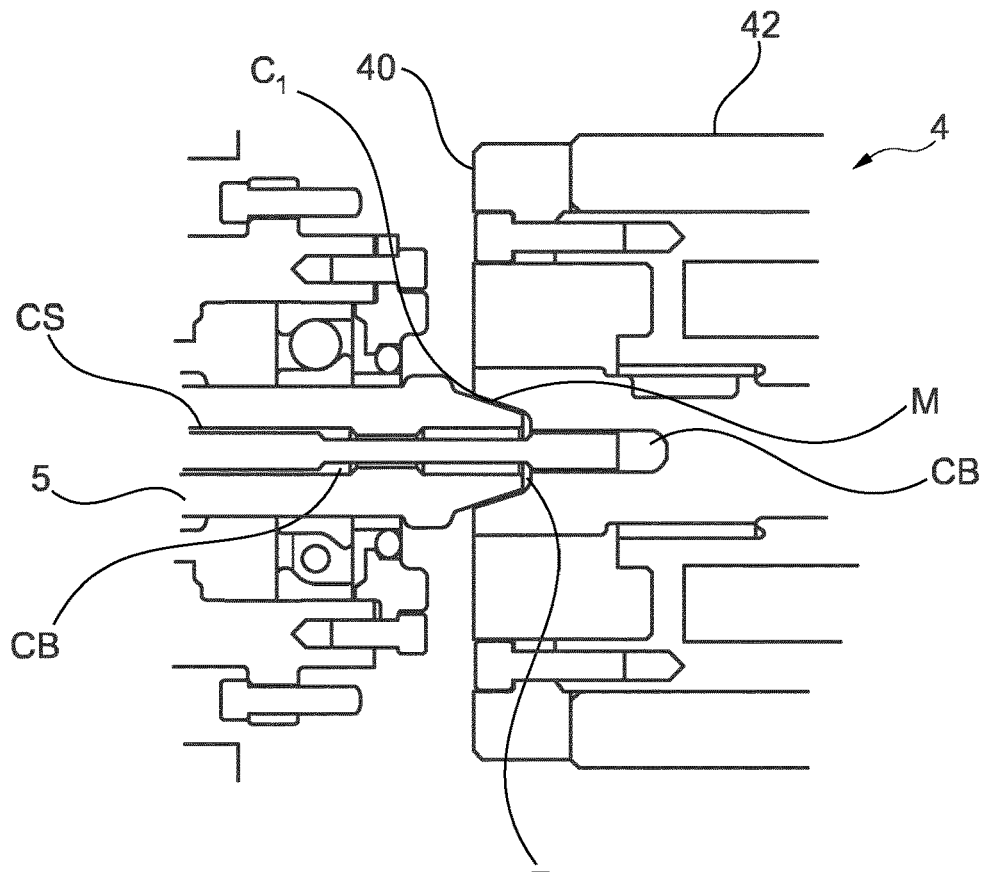
FIG. 2 is a close-up view of the area inside box A in FIG. 1.

Referring now to FIGS. 1 and 2 there is shown a roller apparatus 1 comprising first and second roller sets 2, 3 and a roller apparatus body B. The first roller set 2 comprises a first roller 4, a first transmission shaft 5 and a first support shaft 6. The second roller set 3 comprises a second roller 7, a second transmission shaft 8 and a second support shaft 9. The first and second rollers 4, 7 each extend from a respective first end 40, 70 to a respective second end 41, 71, and each include an outer, work surface 42, 72.

The first end 40 of the first roller 4 is connected to the first transmission shaft 5 by a first pair of connectable portions $C_1$. The second end 41 of the first roller 4 is connected to the first support shaft 6 by a second pair of connectable portions $C_2$. The first end 70 of the second roller 7 is connected to the second transmission shaft 8 by a third pair of connectable portions $C_3$. The second end 71 of the second roller 7 is connected to the second support shaft 9 by a fourth pair of connectable portions $C_4$.

Each transmission shaft 5, 8 and each support shaft 6, 9 are supported by and rotatably attached to the roller apparatus body B, for example by bearings. The transmission shafts 5, 8 and support shafts 6, 9 are formed from metal, for example stainless steel, in this embodiment. The rollers 4, 7 each comprise a central portion surrounded by a peripheral portion. The central portion comprises the first and second ends 40, 70, 41, 71 and is formed from metal, for example stainless steel, in this embodiment.

The first pair of connectable portions $C_1$ comprises a male portion M provided on the first transmission shaft 5 and a female portion F provided in the first end 40 of the first roller 4.

Figure 3:
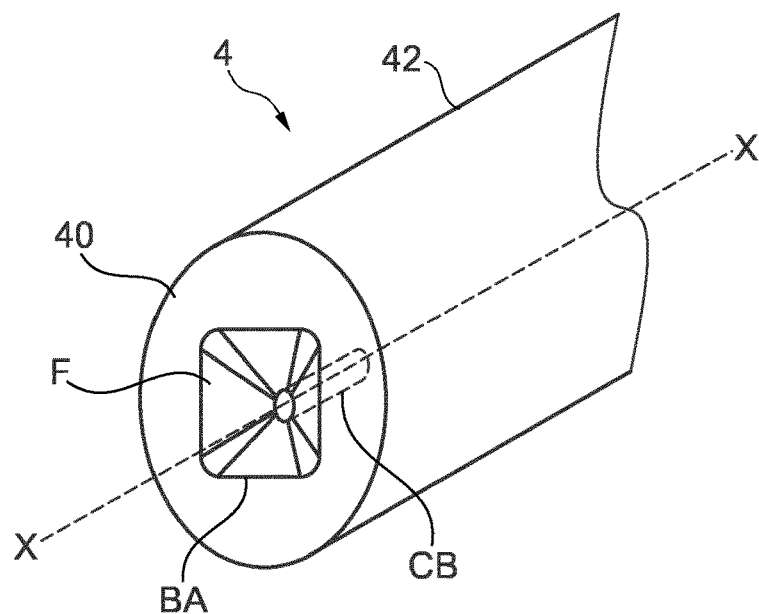
FIG. 3 is a partial perspective view of the end of a roller shown in FIG. 1.
Figure 4:
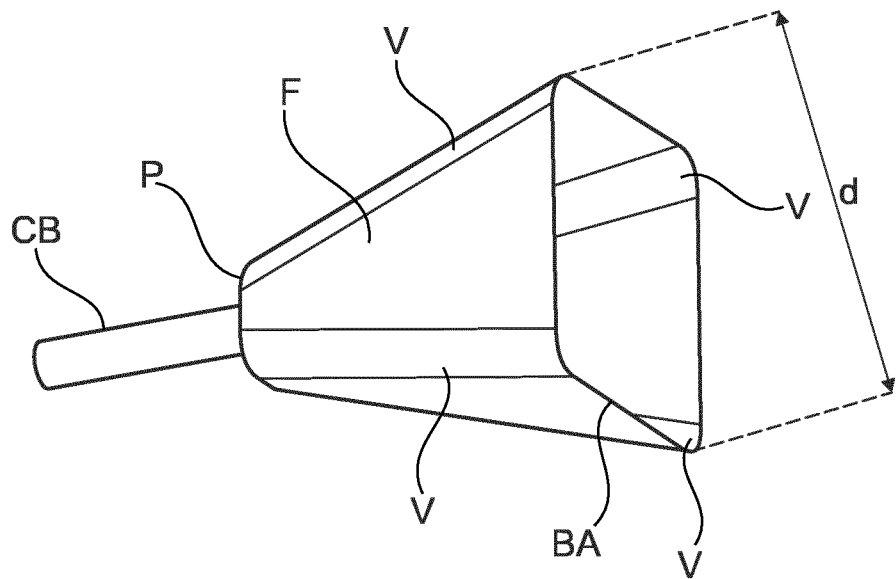
FIG. 4 is a perspective view of the inner surface of the female portion in the end of the roller shown in FIG. 2.
Figure 5:
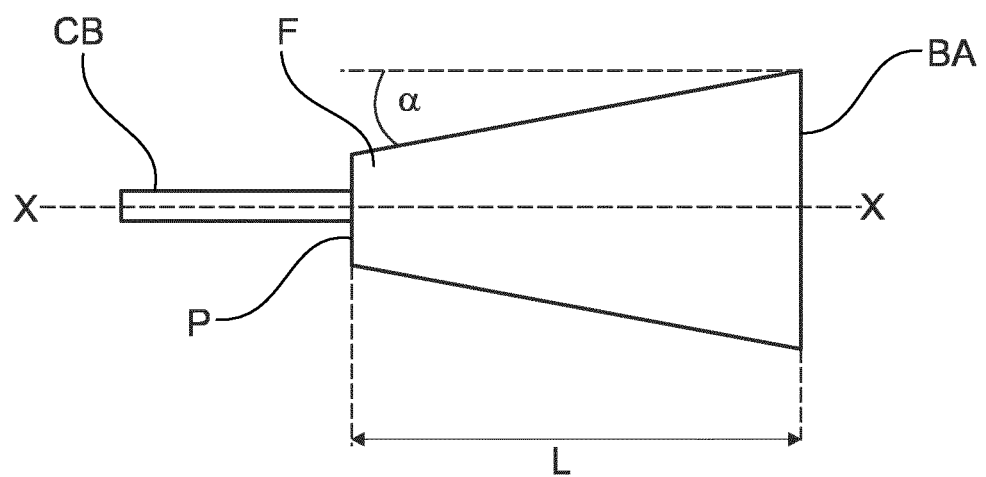
FIG. 5 is a schematic side view of the inner surface of the female portion shown in FIG. 4.

As shown in greater detail in FIGS. 3, 4 and 5, the female portion F comprises a recess in the first end 40 of the first roller 4. The female portion F has a frusto-pyramidal shape with a longitudinal axis if rotation X. The frusto-pyramid tapers inwardly from a base BA at the first end 40 of the first roller 4 towards a peak P. The frusto-pyramid tapers inwardly in the direction from the first end 40 towards the second end 41 of the first roller 4. The frusto-pyramid tapers from its base BA towards its peak P at an angle α. In this embodiment angle α is greater than 2.5 degrees (i.e. the frusto-pyramid tapers inwardly in the direction from the first end 40 towards the second end 41 of the first roller 4 by an included angle of greater than 5 degrees). However, in embodiments angle α may be greater than 3, 4, 5, 6, 7, 8, 9, 10, 11, 12, 13, 14 or 15 degrees. In embodiments, angle α may be between 2.5 and 70 degrees, for example between 3, 4, 5, 6, 7, 8, 9 or 10 degrees and 65, 60, 55, 50, 45, 40, 35, 30, 25, 20 or 15 degrees. In embodiments, the frusto-pyramid may taper inwardly in the direction from the first end 40 towards the second end 41 of the first roller 4 by an included angle (e.g. symmetrical about the longitudinal axis of rotation X) of greater than 6, 7, 8, 9, 10, 11, 12, 13, 14 or 15 degrees. In embodiments, the frusto-pyramid may taper inwardly in the direction from the first end 40 towards the second end 41 of the first roller 4 by an included angle (e.g. symmetrical about the longitudinal axis of rotation X) of between 5, 6, 7, 8, 9, 10, 11, 12, 13, 14, 15, 20, 25 or 30 degrees and 140, 135, 130, 125, 120, 115, 110, 105, 100, 95, 90, 85, 80, 75, 70, 65, 60, 55, 50, 45, 40 or 35 degrees.

The frusto-pyramid of the female portion F has a length L between the base BA and the peak P. The frusto-pyramid of the female portion F has a square cross section in this embodiment (i.e. the polyhedral base of the frusto-pyramid is a square), in which the vertices V of the square are curved. The base BA has a maximum diameter d, which extends between opposed vertices V of the square cross section, in this embodiment. A central bore CB extends from the peak P of the frusto-pyramid towards the second end 41 of the first roller 4. The central bore CB is threaded along at least part of its length.

The first transmission shaft 5 is elongate and extends from a first end to a second end. The male portion M is provided on the first transmission shaft 5, on the first end thereof, as shown in FIGS. 1 and 2. The male portion M comprises a projection which is sized and shaped to correspond to and engagingly cooperate with the female portion F at the first end 40 of the first roller 4, in use. As will be appreciated by one skilled in the art, the description of the shape of the female portion F is applicable also to the shape of the male portion M, which comprises a substantially negative image of the female portion F. A central bore CB extends through the centre of the male portion M along its longitudinal axis of rotation, which corresponds to the longitudinal axis of rotation X of the female portion F.

A central bore CB extends through and along the entire length of the first transmission shaft 5, from the first end to the second end thereof. The central bore CB is threaded along at least part of its length.

The second, third and fourth pair of connectable portions $C_2$, $C_3$, $C_4$ comprise male portions M and female portions F which may optionally be the same as those of the first pair of connectable portions $C_1$ described above, and will not be described herein further.

Prior to use, the first transmission shaft 5 is rotatably retained in and supported by the roller apparatus body B prior to mounting of the first roller 4 thereon. Mounting of the first roller 4 comprises the first roller 4 being connected to the first transmission shaft 5 by the first pair of connectable portions $C_1$. The female portion F in the first end 40 of the first roller 4 is lined up with the male portion M provided on the first transmission shaft 5. The first roller 4 is then moved axially onto the first transmission shaft 5 such that the male portion M is received within the female portion F. In this way, the first roller 4 is at least partially connected to the first transmission shaft 5 by friction fit.

The first transmission shaft 5 and the first roller 4 are then attached by a central screw CS, inserted through the second end of the first transmission shaft 5 and threadedly engaging the central bores CB of both the first transmission shaft 5 and the first end 40 of the first roller 4. Tightening of the central screw CS causes the male portion M and female portion F to axially align, even if they were at least partially misaligned prior to engagement of the central screw CS. Furthermore, tightening of the central screw CS causes compression of the outer surfaces of the male portion M against the inner surfaces of the female portion F. Advantageously, the configuration of the first pair of connectable portions $C_1$ according to the invention ensures the efficient transfer of torque from the first transmission shaft 5 to the first roller 4, in use, relies to a lesser extent on compression of the outer surfaces of the male portion M against the inner surfaces of the female portion F than is the case with a male portion M having a circular cross section. Accordingly, the central screw SC need be tightened to a relatively lesser extent than would be the case were the male portion M to have a circular cross section. Hence, the first pair of connectable portions $C_1$ can be disconnected (and hence the first roller 4 unmounted) in relatively less time than would be the case if the male portion M had a circular cross section.

Furthermore, provision of non-circular cross-section male portion M according to the invention reduces the wear on the pair of connectable portions $C_1$. When the male portion M and female portion F are fully connected the portions M, F are restricted from relative rotation. Accordingly, wear between the male portion M and female portion F is relatively reduced compared to a configuration in which slip may occur even when the portions M, F are fully connected.

The first support shaft 6 is then axially slid into position in the roller apparatus body B. Splines extending along at least part of the length of the first support shaft 6 are engaged with cooperating recesses in the roller apparatus body B. A male portion M at a first end of the first support shaft 6 is then axially slid into engagement with a cooperating female portion F in the second end 41 of the first roller 4, thereby forming a second pair of connectable portions $C_2$. The first support shaft 6 is then attached to the first roller 4 by a central screw CS, threadedly engaged through a central bore CB through and along the length of the first support shaft 6 and a central bore CB into the second end 41 of the first roller 4.

In use, the first transmission shaft 5 is caused to rotate by a motor or other prime mover (not shown) connected thereto. The torque from the first transmission shaft 5 is transmitted to the first roller 4 through the first pair of connectable portions $C_1$, thereby causing the first roller 4 to rotate. The first support shaft 6 rotates freely within the roller apparatus body B, thereby supporting the second end 41 of the first roller 4. Torque is transmitted from the first transmission shaft 5 to the first roller 4 in part due to friction between the outer surfaces of the male portion M and the inner surfaces of the female portion F of the first pair of connectable portions $C_1$.

The second roller 7 is mounted in the second roller set 3 prior to use in the same manner as described above in respect of the first roller 4 in the first roller set 2. The second transmission shaft 8 is also caused to rotate, in use, by a motor or other prime mover (not shown). Articles, for example a tobacco cast leaf sheet, can then be passed between the nip between the first and second rollers 4, 7. In this way, an article, such as tobacco cast leaf sheet, is processed between the working surfaces 42, 72 of the rollers 4, 7.

Removing the first roller 4 comprises:
unscrewing the central screw CS from the central bore CB of the second end 41 of the first roller 4 and the first support shaft 6;
removing the first support shaft 6 from the roller apparatus body B by axially sliding it out therefrom along its splined inter-engagement, in a direction away from the first roller 4, thereby disengaging the second pair of connectable portions $C_2$ between the second end 41 of the first roller 4 and the first support shaft 6;
unscrewing the central screw CS from the central bore CB of the first transmission shaft 5; and
moving the first roller 4 away from the first transmission shaft 5, thereby disengaging the first pair of connectable portions $C_1$ between the first end 40 of the first roller 4 and the first transmission shaft 5.

The removed first roller 4 may subsequently be replaced or repaired.

While the pairs of connectable portions $C_1$, $C_2$, $C_3$, $C_4$ have been described in the context of two roller sets 2, 3, it would be apparent to the skilled person that this description would apply mutatis mutandis to roller apparatus comprising any number of roller sets 2, 3 or, indeed, rollers 4, 7.

It will be appreciated that although the second, third and fourth pairs of connectable portions $C_2$, $C_3$, $C_4$ are described as being the same as the first pair of connectable portions $C_1$ this need not be the case and, instead, one or more of the second, third and fourth pairs of connectable portions $C_2$, $C_3$, $C_4$ may comprise a female portion F having a recess with a cross-section of different shape to the female portion F of the first pair of connectable portions $C_1$. Where the female portion F of one or more of the second, third and fourth pairs of connectable portions $C_2$, $C_3$, $C_4$ has a recess with a cross section of different shape to the female portion F of the first pair of connectable portions $C_1$, the male portion M of the corresponding second, third and/or fourth pair of connectable portions $C_2$, $C_3$, $C_4$ has a complementary shape to that of the female portion F of the relevant second, third and/or fourth pair of connectable portions $C_2$, $C_3$, $C_4$. The cross-sectional shapes of the male and female portions M, F of the first pair of connectable portions $C_1$ may differ from the cross-sectional shapes of the male and female portions M, F of the second pair of connectable portions $C_2$. Advantageously, installation of the first roller 4 in its desired orientation (for example with respect to the second roller 7) may thereby be ensured. Accordingly, installation in the desired orientation of the roller 4 may be achieved relatively more rapidly and readily than may be case when installing a first roller 4 in which the first and second pair of connectable portions $C_1$, $C_2$ each have male portions M having the same cross-sectional shape. Relatively more rapid installation of the first roller 4 results in relatively reduced downtime of the roller apparatus 1, and thereby reduces the expense of using the roller apparatus 1.

While the rollers 4, 7 are described as each comprising a central portion and a peripheral portion, this is not essential to the invention. While central screws CS have been described, they are not essential to the present invention. While central bores CB have been described, they are not essential to the present invention. While support shafts 6, 9 have been described, they are not essential to the present invention.

The schematic drawings are not necessarily to scale and are presented for purposes of illustration and not limitation. The drawings depict one or more aspects described in this disclosure. However, it will be understood that other aspects not depicted in the drawings fall within the scope of this disclosure.

The invention claimed is:

1. A transmission shaft and a roller comprising a pair of connectable portions for connecting the transmission shaft and the roller to be driven by torque exerted through the transmission shaft, the transmission shaft and the roller attached by a central screw threadably engaging a central bore defined by the transmission shaft;
the pair of connectable portions comprising a male portion provided on one of the transmission shaft and roller and a complementary female portion provided on the other of the roller and transmission shaft,
the male portion having a longitudinal axis of rotation and tapering inwardly from a proximal end to a distal end by an angle of between 2.5 and 25 degrees,
wherein the male portion has a non-circular cross section, wherein the central bore extends through and along the entire length of the transmission shaft.

2. A transmission shaft and a roller according to claim 1, wherein the male portion is provided on the transmission shaft and the female portion is provided in the roller.

3. A transmission shaft and a roller according to claim 1, wherein the cross-sectional shape of the male portion remains constant along at least 50% of the distance from the proximal end to the distal end.

4. A transmission shaft and a roller according to claim 1, wherein the male portion has an order of rotational symmetry from 1 to 20.

5. A transmission shaft and a roller according to claim 1, wherein the male portion has an elliptical or polygonal cross section.

6. A transmission shaft and a roller according to claim 1, wherein the male portion has a polygonal cross section and wherein the vertices are curved.

7. A transmission shaft and a roller according to claim 1, wherein the male portion has a rectangular cross section.

8. A roller set comprising a transmission shaft and a roller according to claim 1 wherein the transmission shaft engages a first end of the roller and further comprising a second shaft for engaging a second end of the roller.

9. A roller set according to claim 8, wherein the roller and the second shaft comprise a second pair of connectable portions having a second male portion located on one of the roller and the second shaft and a complementary second female portion located on the other of the second shaft and the roller, wherein the second male portion has a non-circular cross section.

10. A roller set according to claim 8, wherein the roller and the second shaft comprise a second pair of connectable portions having a second male portion located on one of the roller and the second shaft and a complementary second female portion located on the other of the second shaft and the roller, wherein the second male portion has a circular cross section.

11. A pair of roller sets for passing a sheet material therebetween, the first roller set according to claim 8.

12. A pair of roller sets according to claim 11, wherein the second roller set comprises a pair of connectable portions according to claim 1.

13. A pair of roller sets according to claim 12, wherein the pair of connectable portions of the second roller set comprises a male portion with a different cross-sectional shape to that of the male portion of the pair of connectable portions of the first roller set.

14. A pair of roller sets according to claim 11, wherein the pair of roller sets is arranged to process a cast leaf tobacco sheet between the roller of the first roller set and the roller of the second roller set.

15. A transmission shaft and a roller according to claim 1, wherein the male portion has an elliptical or polygonal cross section.

16. A method of forming a connection between a transmission shaft and a roller to be driven by torque exerted through the transmission shaft, the method comprising:
   axially aligning a male portion provided on one of the transmission shaft and roller with a complementary female portion provided on the other of the roller and transmission shaft;
   moving the transmission shaft and roller relatively toward one another axially, such that the male portion engages within the complementary female portion; and
   attaching the transmission shaft and the roller using a central screw threadably engaging a central bore defined by the transmission shaft;
   wherein the male portion has a longitudinal axis of rotation, tapers inwardly from a proximal end to a distal end by an angle of between 2.5 and 25 degrees and has a non-circular cross section, wherein the central bore extends through and along the entire length of the transmission shaft.

17. A transmission shaft and a roller comprising a pair of connectable portions for connecting the transmission shaft and the roller to be driven by torque exerted through the transmission shaft,
   the pair of connectable portions comprising a male portion provided on one of the transmission shaft and roller and a complementary female portion provided on the other of the roller and transmission shaft,
   the transmission shaft and the roller attachable by a central screw threadably engaging a central bore defined by the transmission shaft, and
   the male portion having a longitudinal axis of rotation and tapering inwardly from a proximal end to a distal end,
   wherein the male portion has a non-circular cross section, and wherein the central bore extends through and along the entire length of the transmission shaft.

18. A transmission shaft and a roller according to claim 17, wherein the male portion is provided on the transmission shaft and the female portion is provided in the roller.

19. A transmission shaft and a roller according to claim 17, wherein the cross-sectional shape of the male portion remains constant along at least 50% of the distance from the proximal end to the distal end.

20. A transmission shaft and a roller according to claim 17, wherein the male portion has an order of rotational symmetry from 1 to 20.

* * * * *